United States Patent [19]

Gianzero et al.

[11] Patent Number: 5,038,107

[45] Date of Patent: Aug. 6, 1991

[54] METHOD AND APPARATUS FOR MAKING INDUCTION MEASUREMENTS THROUGH CASING

[75] Inventors: Stanley C. Gianzero; Roland E. Chemali, both of Austin; Paul Sinclair, Clearlake Shores; Shey-Min Su, Austin, all of Tex.

[73] Assignee: Halliburton Logging Services, Inc., Houston, Tex.

[21] Appl. No.: 454,605

[22] Filed: Dec. 21, 1989

[51] Int. Cl.$^5$ .............................................. G01V 3/28
[52] U.S. Cl. .................................... 324/339; 324/346; 324/368
[58] Field of Search ............................ 324/332–346, 324/219–221, 368

[56] References Cited

U.S. PATENT DOCUMENTS

| | | | |
|---|---|---|---|
| 2,259,904 | 10/1941 | McNamee et al. | 324/346 |
| 2,401,280 | 5/1946 | Walstrom | 324/346 |
| 2,582,314 | 1/1952 | Doll | 324/339 |
| 3,277,363 | 10/1966 | Schuster | 324/346 X |
| 3,555,409 | 1/1971 | Atwood et al. | 324/340 |
| 3,890,563 | 6/1975 | Dowling et al. | 324/346 X |
| 4,499,422 | 2/1985 | Sinclair . | |
| 4,529,939 | 7/1985 | Hagiwara | 324/339 |
| 4,724,385 | 2/1988 | Vail, III . | |
| 4,748,415 | 5/1988 | Vail, III . | |
| 4,796,186 | 1/1989 | Kaufman . | |
| 4,820,989 | 4/1989 | Vail, III . | |
| 4,837,518 | 6/1989 | Gard et al. . | |

*Primary Examiner*—Kenneth A. Wieder
*Assistant Examiner*—Warren S. Edmonds
*Attorney, Agent, or Firm*—William J. Beard

[57] ABSTRACT

High resolution induction logs (28) are obtained through borehole casing (15) by magnetically saturating the casing (15), logging with a tool (10) having different transmitter (35a, 35b)-to-receiver (40) coil spacings, and determining the formation (30) conductivities as a function of the coil spacings, coil frequency, and phase difference between the signals at these spacings. The logging is preferably done at an intermediate frequency which gives good resolution but is little affected by the saturated casing.

27 Claims, 8 Drawing Sheets

— FOCUSED INDUCTION TOOL (WITH CASING)
------- HIGH RESOLUTION INDUCTION TOOL

METHOD AND APPARATUS FOR MAKING INDUCTION MEASUREMENTS THROUGH CASING

BACKGROUND OF THE INVENTION

The present invention relates to well logging tools, and more particularly to induction logging methods and apparatus for measuring the resistivity (or its inverse, conductivity) of earth formations penetrated by a borehole.

The basic principles and techniques for induction logging of earth formations are well known. In brief, the resistivities of the various formation structures are determined by inducing eddy currents to flow in the formations in response to an AC transmitter signal, and then measuring a phase component in a receiver signal generated by the eddy currents. Usually the component of the receiver signal which is in phase with the transmitter signal is taken as indicative of the formation conductivity. With proper coil design, the output signal can be directly and linearly proportional to the electrical conductivities of the formations over formation conductivity values most commonly encountered. The output signal is then multiplied by an appropriate tool constant for recording at the surface as a function of the depth of the tool in the borehole.

One significant limitation to most current induction logging technology has been the inability to log satisfactorily through casing as commonly encountered in a cased well borehole. The measurement of formation properties behind casing has numerous important applications including monitoring of the oil/water contact, reevaluation of the formation in existing wells after production, and reservoir monitoring through observation wells. Unfortunately, attempts at induction logging through casing have thus far not been commercially satisfactory. That is, to the extent the designs worked, they were too slow or too inaccurate to be commercially acceptable.

The major problem with induction logging through casing is readily appreciated when one remembers that steel casing is about $10^7$ more conductive than the formations being measured. Thus the casing either "shorts out" the AC fields from the logging tool's transmitter coils (by completely blocking them if the frequency is above the casing cut-off frequency—a function of the casing thickness), or the casing effectively masks the formation signal component behind the massively greater casing signal component.

To get around this problem, one prior art technique (U.S. Pat. No. 4,748,415) utilized logging frequencies of 0.001 Hz to 20 Hz, stressing that higher frequencies would be unable to penetrate the casing. This is three to four orders of magnitude less than the 10 kHz to 40 kHz frequencies ordinarily preferred for open hole induction logging. U.S. Pat. No. 4,499,422, for example, specifies this frequency range to optimize the trade-offs between skin effect, tool sensitivity, and resolution for open hole induction logging.

Because of the lack of acceptable through casing induction technology, the major current methods for measuring formation properties behind casing rely essentially on nuclear technology. These techniques include, for example, neutron thermal decay logs and gamma spectroscopy logs. Notably, there has been considerable interest in being able to perform induction logging in cased holes. Certainly, in open holes the commercial preference has been for resistivity type measurements rather than thermal decay logs.

A need therefore remains for methods and apparatus for high resolution induction logging through casing in a borehole, and in particular, for such methods and apparatus which can be performed economically, accurately, and rapidly enough to be commercially viable.

SUMMARY OF THE INVENTION

Briefly, the present invention meets the above needs and purposes with high resolution induction logging methods and apparatus based upon technology and equipment similar to that used for open hole induction logging. Better yet, the main operating frequency is about 2 kHz, which is about one order of magnitude lower than the 20 kHz frequency customary for open hole induction logging, and several orders of magnitude greater than the maximum thought possible in prior teachings such as the '415 patent noted above. Also measurements according to the present invention can be made with two different transmitter-to-receiver spacings; the casing is magnetically saturated to reduce its permeability substantially to unity; and the phase difference between the formation conductivity signals at these two different receiver coil spacings is obtained. Then, in the preferred embodiment, the apparent conductivity of the borehole formations is determined from these measurements by dividing an appropriate constant by the transmitter frequency and then multiplying that quotient by the square of the ratio of the phase difference to the difference in the two different effective spacings. In another approach, one may determine casing thickness and related electrical properties; for instance, casing thickness is inferred from receiver signal magnitude. Measured phase differences in signals from a pair of spaced receiver antenna coils can be used to obtain a relatively simple measure of inductively measured resistivity through casing. Also, a balanced tool is used in the preferred embodiment to substantially increase the phase sensitivity. The term "balanced" hereafter means the offset or cancellation of two signals with the two receiver coils nulling the mutual inductance in air within a specified difference range.

It is therefore a feature of the present invention to provide improved methods and apparatus for making induction measurements through casing wherein such methods and apparatus make high resolution induction logging measurements notwithstanding the interposed casing. Such measurements are obtained by a system including coil means having transmitter and receiver coils adapted for movement along the interior of the casing, means for energizing the transmitter coils to induce in the receiver coils signals characteristic of the conductivity of formations adjacent the borehole, means for magnetically saturating the casing in the vicinity of the coil means to substantially reduce the effective magnetic permeability of the casing, means associated with the coil means for measuring the characteristic formation conductivity signals at a plurality of different effective spacings between the transmitter and receiver coils while the casing is thus magnetically saturated, and means for detecting the phase difference between at least a pair of the formation conductivity signals measured at two different effective spacings and for determining from the phase difference the apparent conductivity of borehole formations behind the casing in the vicinity of the coil means. This system further preferably has the coil means which may include plural transmitter coil sets in which the transmitter coil sets may be a pair of transmitter coil sets, and in which the coil means may include plural receiver coil sets in which the receiver coil sets may be a pair of receiver coil sets. The system further operates at a frequency for energizing the transmitter coils which may be less than approximately two kHz in operation of a balanced or nearly balanced induction logging system. The means for energizing the transmitter coils may energize the coils at multiple frequencies, preferably about two kHz and approximately twenty kHz, so that the means for measuring the characteristic formation conductivity signals may include means for comparing the characteristic formation conductivity signals at each of the two kHz and twenty kHz frequencies for substantially removing possible residual casing signals at the lower of these operating frequencies. The system further has means for magnetically saturating the casing which may include means for inducing a DC current in the transmitter coils which is sufficiently massive to saturate the casing in the vicinity of the coils, the means for magnetically saturating the casing optionally includes a magnetic core within the coils with means on the ends of the magnetic core for coupling magnetic fields therein to the surrounding and adjacent casing, a non-magnetic, conductive shield between the core and the coil means for expelling AC magnetic fields from the core, and field concentrating means between the shield and the coils. In this system, this means for determining the apparent conductivity of the borehole formations may determine the conductivity by dividing a predetermined constant by the transmitter frequency and then multiplying that quotient by the square of the ratio of the phase difference to the difference in the two different effective spacings. In one form of this invention, the coils means may be symmetrical and may include transmitter coils symmetrically located on each side of the receiver coil means and which may include means coupled to the receiver coil means for generating a log of the conductivity of the formations. In another form, reading from a pair of spaced receiver coils are measured to obtain phase differences from the coils; these lead directly to the desired formation resistivity by simple multiplication of the data. Accordingly, data is readily presented in a normalized fashion. To accomplish the above features and purposes, an inexpensive, uncomplicated, durable, versatile, and reliable method and apparatus are disclosed which are inexpensive to manufacture, and readily suited to the widest possible utilization in induction logging of each formations.

These and other features and advantages of the invention will be apparent from the following description, the accompanying drawings, and the appended claims.

BRIEF DESCRIPTION OF THE DRAWINGS

FIG. 9 is an alternate arrangement showing two separate receiver coils spaced from a transmitter coil wherein the phase difference between the receiver coil signals is measured;

FIGS. 11 and 12 are similar plots on semi-log graphs showing relative phase difference in a two receiver system wherein FIG. 11 is obtained in open hole and FIG. 12 in a cased hole;

DESCRIPTION OF THE PREFERRED EMBODIMENTS

Figure 1:
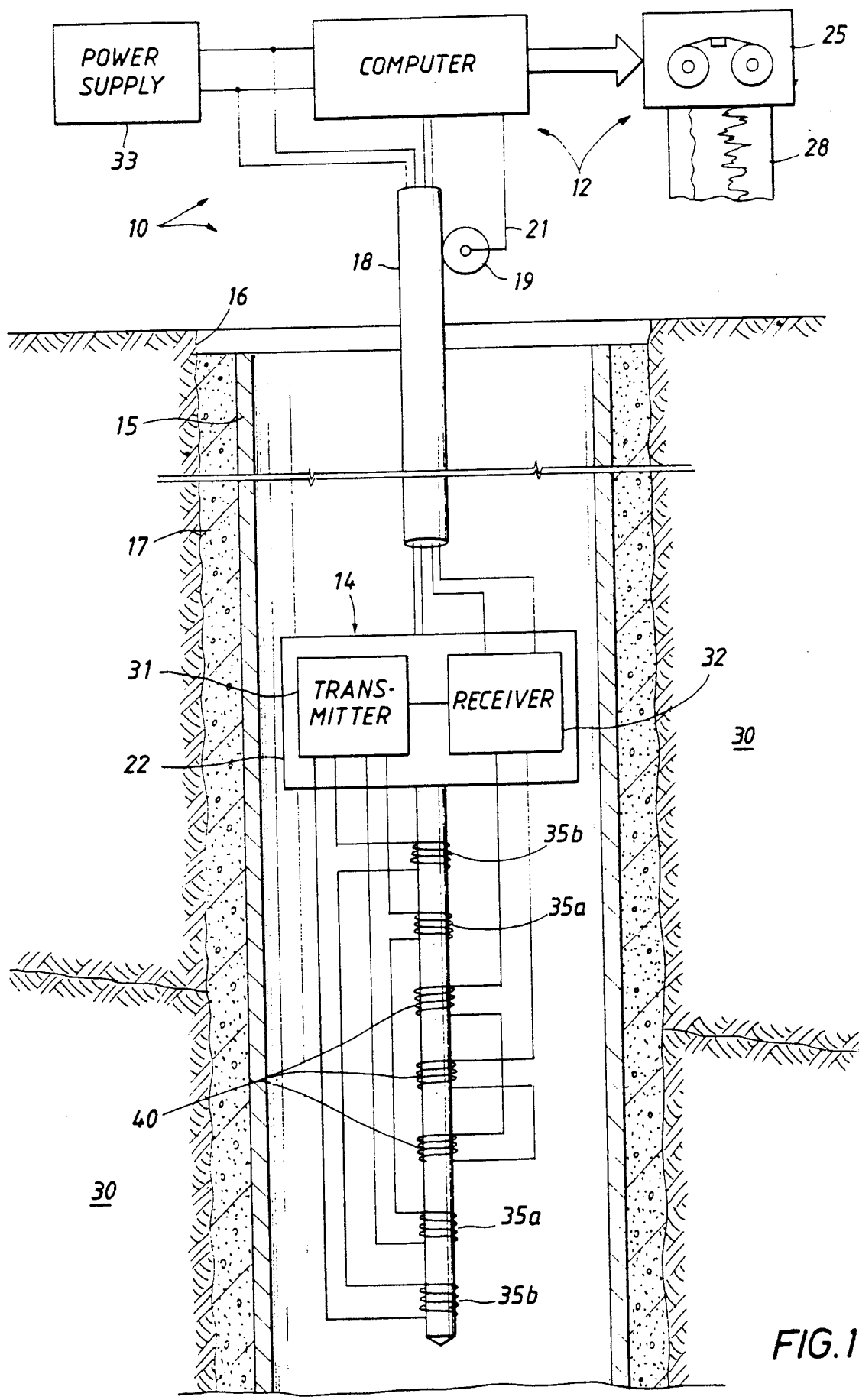
FIG. 1 is a simplified block diagram showing an induction logging apparatus according to the present invention positioned in casing in a wellbore.

With reference to the drawings, the new and improved apparatus for induction logging, and the method therefor according to the present invention, will be described. FIG. 1 is a somewhat figurative block diagram showing a preferred embodiment of an induction logging apparatus 10 according to the present invention. The dimensions in FIG. 1 are exaggerated and certain conventional details omitted for clarity of illustration and tutorial purposes, it being understood that in practice the coils are supported on a mandrel and enclosed in a non-magnetic housing (both not shown), and positioned much closer to the casing.

Mechanically, the preferred embodiment 10 is substantially the same as that shown in co-pending U.S. patent application Ser. No. 40,879, filed on Apr. 21, 1987, and assigned to the assignee of the present invention. The '879 disclosure is accordingly incorporated herein by reference, and, except for the improvements taught by the present invention, only an abbreviated description of the overall structure and operation of tool 10 will be given.

As shown in FIG. 1, the logging device includes surface equipment 12 and a downhole sonde portion 14. The sonde 14 is shown in a casing 15 in a borehole 16, the casing being cemented to the borehole by cement 17. The sonde 14 is supported in the casing by a conventional logging cable 18, both of which are raised and lowered within borehole 16 in known fashion on passing over a sheave 19 located at the surface equipment 12. The cable is spooled onto a drum. The cable 18 connects downhole electronics 22 with a computer and recording system 25 located at the equipment 12 for generating a log 28 of the resistivities of the various earth formations 30 through which borehole 16 passes. The electronic circuits include an oscillator 31, detector 32, power supply 33, and other appropriate support circuits as more specifically described in the above-noted '879 application or otherwise well known in the art. The circuits 31 and 32 may be thought of as the transmitter and receiver in conjunction with the respective coils driven thereby. These circuits induce AC currents into the transmitter coil sets 35a and 35b, and then detect and measure the phase components of interest consequently induced into the receiver coils 40 by the resulting eddy currents flowing in the formations 30 which surround the borehole. The processing of these various signals is then carried out in the computer 25 to form the log 28 having the data of interest as a function of depth. The sheave 19 connects to the computer 25 by means of a depth measuring means 21 to form the log 28 as a function of depth.

The basic measurement is achieved from a measurement of the phase differential in the receiver coils at two different transmitter-to-receiver spacings in an induction logging tool, after the casing is saturated to reduce the magnetic permeability toward unity. Although any suitable technique may be used to saturate the casing, it is preferably saturated in the present invention using technology such as that described with respect to FIG. 2, below, which has some features similar to that employed in self-contained pipeline inspection equipment, namely, a massive DC current supplied to coils near the casing. Thus, using appropriate circuitry in known fashion, the oscillator circuit 31 superimposes the AC induction signal on top of the massive DC current in the coils. Although the DC current is quite large, little power is required to maintain it, so the method for magnetically saturating the casing is actually quite efficient.

Figure 2:
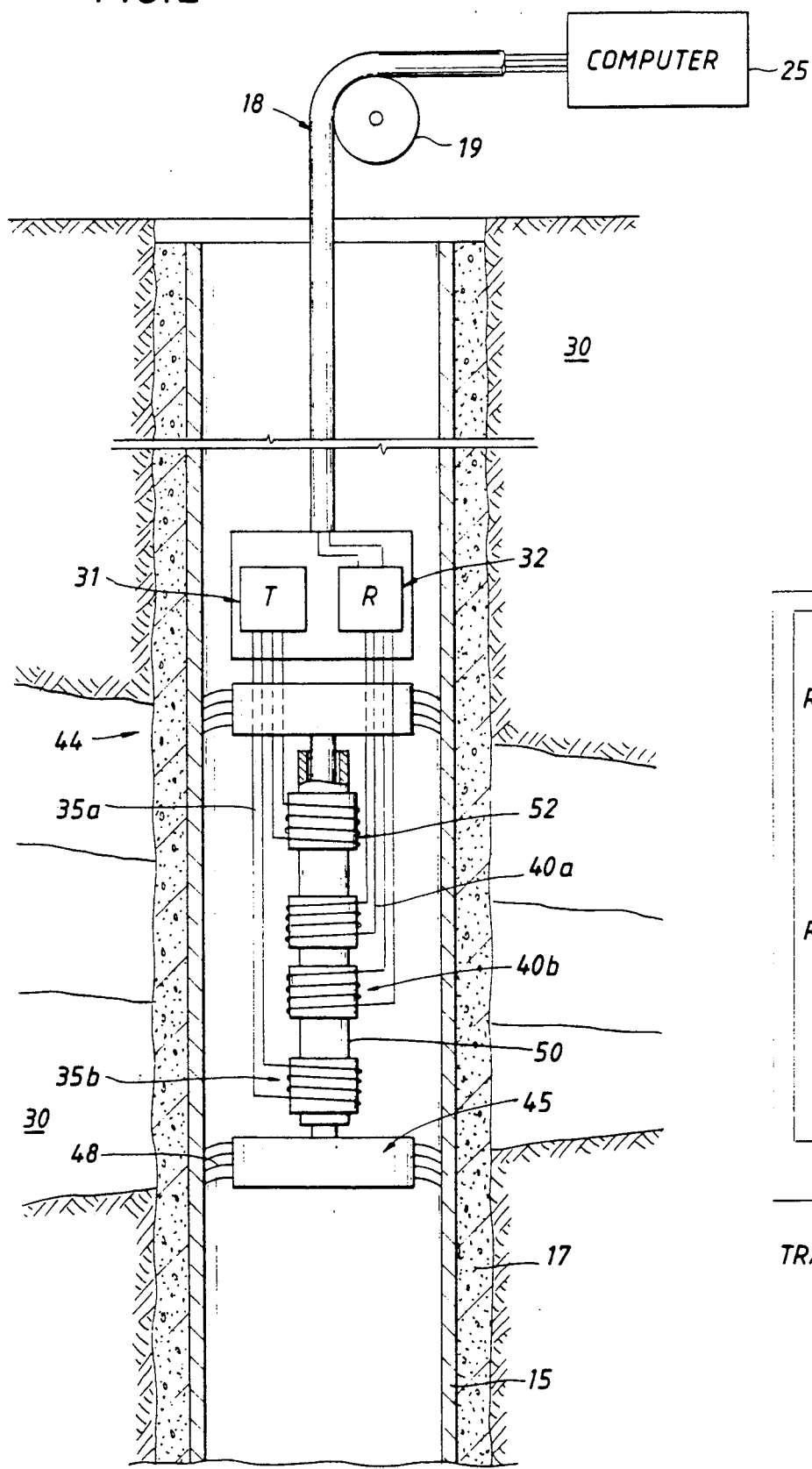
FIG. 2 is an abbreviated illustration similar to FIG. 1 showing an alternative sonde embodiment having means for concentrating the saturating magnetic fields.

FIG. 2 shows an alternate sonde embodiment 44 having means for concentrating the saturating magnetic fields to increase the efficiency of the sonde. The sonde 44 embodiment also shows that various alternative coil configurations can be used with the present invention consistent with the principles developed further below. Accordingly, like reference numerals are used for components analogous to those in the FIG. 1 embodiment.

The sonde 44 includes a core 45 made of high $\mu$ material (e.g., iron) having a central portion which supports a pair of transmitter coils 35a and 35b (which may be alternately energized, if desired), and a pair of receiver coils 40a and 40b. The enlarged ends of the core 45 have radially extended whiskers 48 for closing the magnetic circuit between the core 45 and adjacent casing 15. Between the core 45 and the coils 35 and 40 is a non-ferrous conductive shield 50 of tubular shape or construction. The tube 50 is made of a non-magnetic material such as copper. The copper tube supports a surrounding coil form 52 of flux-concentrating material such as ferrite. Then, when the circuit 31 induces a high DC current in the coils, the core 45 and whiskers 48 concentrate this DC flux into the casing so that it saturates the casing in the vicinity of the coil structure.

Of course, to make the induction measurements, the circuit 31 also induces AC currents into the coils 35 in addition to the casing-saturating DC current. The copper tube 50 then provides the important advantage of shielding the core 45 from these AC field components and also of shielding the core from the AC fields returning from the formations. In this manner the much weaker AC fields are not disturbed or "shorted-out" by the relatively massive magnetic material of the core 45 and the large DC flux in the core 45. Instead, the action of the core 45 is shielded to involve only the DC magnetic field.

The AC magnetic fields, having been screened from the core by the copper shield tube 50, pass through the coils in a thin annulus between the coils and the copper tube. There is an analogy in the behavior of these fields to that which is employed at much higher frequencies (many MHz) in Electromagnetic Wave Resistivity (EWR) measurements, such as commonly used in Measurement While Drilling (MWD) procedures. However, the preferred embodiment of the present invention uses much lower frequencies, on the order of 1-2 kHz. The thin ferrite cores 52 introduced inside the coils 35 and 40 and external of the tube 50 concentrate the AC flux for better measurement by the coils.

THEORY OF OPERATION

Figure 3:
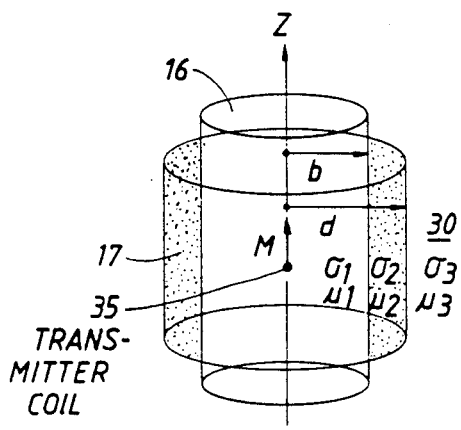
FIG. 3 illustrates a point transmitter coil located in the center of a cased hole in a homogeneous formation for tutorial purposes.

Referring no to FIG. 3, the parameters are located schematically for developing the induced magnetic fields created by a point transmitter coil 35 of magnetic moment M located in the center of a cased hole 16 in a surrounding homogeneous formation 30. The subscripts 1, 2, and 3 refer respectively to the region inside the casing, the casing 15 itself, and the formations 30 outside the casing. As indicated above, details of the coil size, coil mandrel, and sonde housing are omitted from the present analysis. With the casing magnetically saturated ($\mu=1$), the magnetic field $H_z$ on the axis of the transmitter coil 35 at a distance $H_z(O,L)$ is the magnetic field from the total signal and can then be shown to be:

$$H_z(O,L) = \frac{M(1 - ik_1L)}{2\pi L^3} e^{ik_1L} + \tag{1}$$

$$\frac{M}{4\pi b^3} \int_{-\infty}^{\infty} d\lambda \beta_1^2 \Gamma(\lambda) e^{i\lambda \frac{L}{b}}$$

where the time dependence has been suppressed to simplify the expressions developed below.

In equation (1), the total "reflection" coefficient $\Gamma(\lambda)$ represents the combined effects of the borehole, casing and formation conductivities:

$$\Gamma(\lambda) = \gamma_{21} + \frac{\tau_{12}\tau_{21}\gamma_{32}}{1 - \gamma_{12}\gamma_{32}} \tag{2}$$

The reflection coefficients, $\gamma_{21}$, $\gamma_{12}$, and $\gamma_{32}$, and the transmission coefficients, $\gamma_{12}$ and $\gamma_{21}$, represent the elementary individual reflections and transmissions of the cylindrical waves at each material boundary or interface.

Indeed, Equation (2) can be rewritten as:

$$\Gamma(l) = \gamma_{21} + \tau_{12}\tau_{21}\gamma_{32}[1 + \gamma_{12}\gamma_{32} + (\gamma_{12}\gamma_{32})^2 + \ldots] \tag{3}$$

where the individual reflection and the transmission events are indicated by each term in the above. Their specific forms are shown in Equations (4) through (9):

$$\gamma_{12} = \cfrac{1}{\cfrac{\mu_2}{\mu_1} \beta_1 I_0(\beta_1) K_1(\beta_2) + (\beta_2) K_0(\beta_2) I_1(\beta_1)} \quad (4)$$

$$\gamma_{21} = \frac{\mu_2}{\mu_1} \gamma_{12} \quad (5)$$

$$\gamma_{12} = \left[ \frac{\mu_1}{\mu_2} \beta_2 I_0(\beta_2) I_1(\beta_1) - \beta_1 I_0(\beta_1) I_1(\beta_2) \right] \gamma_{21} \quad (6)$$

$$\gamma_{21} = \left[ \frac{\mu_2}{\mu_1} \beta_1 K_0(\beta_1) K_1(\beta_2) - \beta_2 K_0(\beta_2) K_1(\beta_1) \right] \gamma_{12} \quad (7)$$

$$\gamma_{23} = \cfrac{1}{\cfrac{\mu_3}{\mu_2} \beta_2 d/b I_0(\beta_2 d/b) K_1(\beta_3 d/b) + \beta_3 d/b K_0(\beta_3 d/b) I_1(\beta_2 d/b)} \quad (8)$$

$$\gamma_{32} = \left[ \frac{\mu_3}{\mu_2} \beta_2 d/b K_0(\beta_2 d/b) K_1(\beta_3 d/b) - \beta_3 d/b K_0(\beta_3 d/b) K_1(\beta_2 d/b) \right] \gamma_{23} \quad (9)$$

with $$\beta_i = \sqrt{\lambda^2 - \kappa^2 b^2}, \ i = 1,2,3$$

and the ordinary propagation constants $k_i$ being defined in terms of the skin depths $\delta_i$ in the respective media:

$$\kappa_i = \frac{1 + i}{\delta_i}$$

Because the signal is highly attenuated inside the casing, Equation (2) can be approximated by the first two terms in Equation (3), viz:

$$\Gamma(\lambda) \approx \gamma_{21} + r_{12} r_{21} \gamma_{32} \quad (10)$$

The first reflection term, $\gamma_{21}$, under the integral sign essentially constitutes the borehole signal. Mathematically, it contains branch points (i.e. the zeroes of $B_1$ and $B_2$) and poles (i.e. the zeroes of the denominator of $\gamma_{21}$). It can be shown that the branch line integral for $B_1$ just cancels the source term in Equation (1). (See Chew, W. C., "The Singularities of the Fourier-Type Integral in a Multi-Cylindrical Layer Problem", IEEE Transactions on Antennas and Propagation, Vol. AP-31, pp. 653–655, July, 1983.) On the other hand, the branch line integral for $B_2$ corresponds to the lateral wave travelling just inside the casing. Since this signal will be highly attenuated, it will henceforth be neglected because it is substantially nil.

The only remaining contribution is due to the poles which represent the resonant modes within the borehole and they are usually negligible at the operating frequency of the tool.

Figure 4:
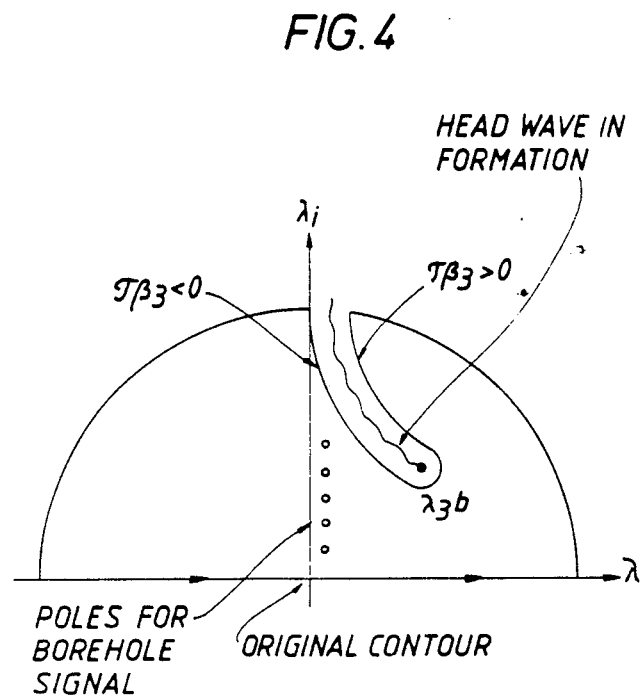
FIG. 4 depicts graphically the mathematical analysis of a wave travelling in the formation when the analysis is extended away from the real axis into the complex $\lambda$ plane.

With respect, now, to the formation signal, the only mathematical singularity of any consequence is the branch point $B_3$ which corresponds to the lateral wave travelling in the formation. Mathematically, what is done to study this contribution is to extend the region of analyticity of Equation (1) away from the real axis into the complex $\lambda$plane, as shown in FIG. 4. For the purpose of clarity, only the $B_3$ branch cut is shown in FIG. 4.

The result of an asymptotic approximation to the branch line contribution is given below:

$$H_{zB}(O.L) = -8 \left( \frac{\mu_2}{\mu_0} \right)^2 \frac{M}{\pi b^3} \frac{(d/b)}{k_3 b} \cfrac{e^{ik_2 r \cos(\theta - \theta_4)}}{\left[ 2\left(\frac{\mu_2}{\mu_0}\right) - i\sqrt{k_2^2 - k_3^2 b}\right]^2} \left( \frac{k_3^2}{r} \right) \frac{b^4}{(\tan\theta - \tan\theta_c)^2} \quad (11)$$

Figure 5:
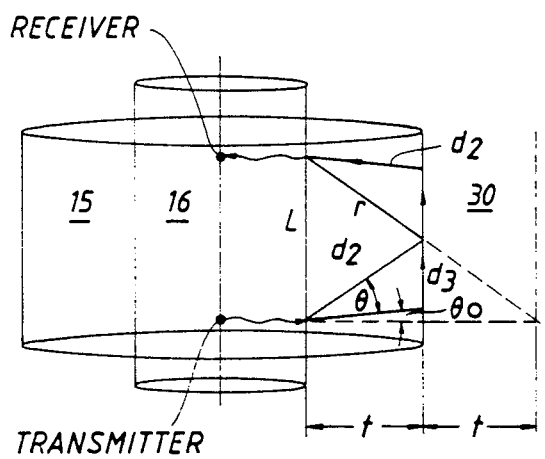
FIG. 5 illustrates the path of the transmitter signal as it traverses the borehole and casing, travels through the formation along the outside of the casing, and is directed back into the casing to return to the borehole for detection by a receiver.

The physical significance of the previous equation can be appreciated from a consideration of FIG. 5. Mathematically it can be shown that the phase factor in Equation (11) can be written as:

$$\kappa_2 r \cos(\theta - \theta c) = 2\kappa_2 d_2 + \kappa_3 d_3 \quad (12)$$

where the distances $d_2$ and $d_3$ are shown in (12) FIG. 5. Consequently, this principal contribution to the total signal can be interpreted according to ray theory. Thus, the signal from the transmitter 35 (below the cut-off frequency of the casing 15) travels as an evanescent wave (i.e., curly line) across the borehole 16. There, it emerges as a ray at the critical angle of refraction, which is nearly zero in this case, and traverses the casing 15. This ray then travels along the outside of the casing in the surrounding formation 30, shedding energy laterally back into the casing 15 along the critical angel of refraction. This energy finally traverses the wellbore 16 where it is sensed by the receiver 40.

With these ideas in mind, one can now specify the conductivity of the formations 30 adjacent the coils as a function of the phase differences across signals received at two different transmitter-to-receiver spacings. Of course, these multiple spacings can be obtained in whatever manner is preferred by the practitioner. For example, multiple transmitter coils 35a and 35b could be used in conjunction with a single receiver coil set 40, as illustrated in FIG. 1. Alternatively, several transmitter and receiver coil sets could be used. Or, as illustrated in FIG. 6, a single transmitter coil 55 can be used along with a pair of receiver coils 60a and 60b.

Figure 6:
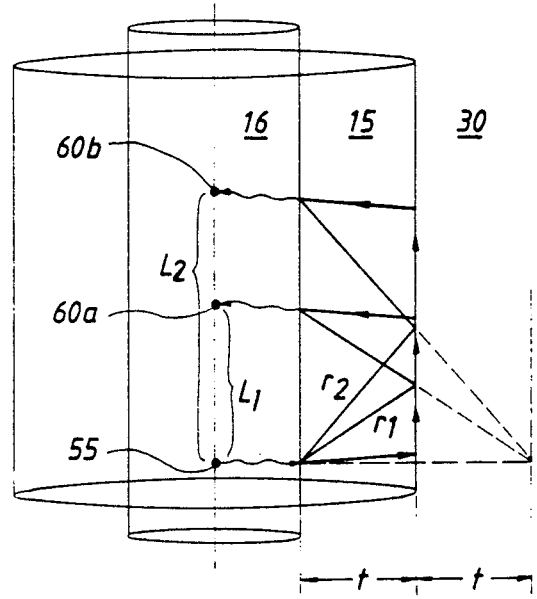
FIG. 6 is an illustration similar to FIG. 5 depicting the case for two different transmitter-to-receiver spacings.

Referring more particularly to FIG. 6, a measurement of the ratio of two received voltages $V_1$ and $V_2$ located at spacings $L_1$ and $L_2$ from the common transmitter (where the subscripts are spacing subscripts, not media subscripts) yields:

$$\frac{V_2}{V_1} = e^{ik2(r2-r1)\cos(\theta-\theta c)} \approx e^{ik3(L2-L1)} \quad (13)$$

which leads to the following empirical equation for the apparent conductivity of the formation:

$$\sigma_a = \frac{19815}{f} \left( \frac{\theta_2 - \theta_1}{L_2 - L_1} \right)^2 \quad (14)$$

where $\theta_2 - \theta_1$ is the measured phase difference across the receivers and f is the operating frequency of the tool. The distance $L_2 - L_1$ is normally a fixed value and can be part of the constant of equation (14).

At this point it will be useful to discuss the relationship between induction measurements based upon detected phase differentials and induction measurements based upon the magnitude of the R (in-phase) signal. While generally thought of as different techniques, each filling a need within its own frequency range, it will now be shown that these measurements are actually very closely related. In fact, to a first order approximation for selected frequencies, they can be considered the same. The former, which measures phase differences between spaced receivers has been preferred in MHz high frequency applications (e.g., the ~2 MHz EWR). The latter, which often uses a mutually balanced sonde while looking primarily only at the magnitude of the in-phase signal component, has been preferred in 1-100 kHz lower frequency applications (e.g., ~20 kHz standard induction measurements), in part due to the difficulty of accurately measuring small phase differences at lower frequencies.

To show the similarities between these two methods of operating induction type devices (both of which are well known in the art and therefore not illustrated in the drawings), we will consider both approaches in the case of no skin effect at low frequency and high resistivity. In the first case, the phase shift in an unbalanced sonde between coils $M_1$ and $M_2$ at different spacings from a transmitter T will be measured. In the second case, the sonde will be balanced (by approximately adjusting the turns ratio $n_1:n_2$) and then the differences in the real part of the signal R will be measured.

CASE 1

The phases in receiver coils 1 and 2 are:

$\phi_1 = \arctan(R_1/X_1)$ $\phi_2 = \arctan(R_2/X_2)$

Therefore, the measurement (the difference) is:

$$(\phi_1 - \phi_2) = \tan^{-1}\left(\frac{R_1}{X_1}\right) - \tan^{-1}\left(\frac{R_2}{X_2}\right) \quad (15)$$

Since $R >> X$ (i.e., the mutual is very large vis-a-vis X), we can approximate this measurement value with the first term of a series expansion:

$$(\phi_1 - \phi_2) = \left(\frac{R_1}{X_1} - \frac{R_2}{X_2}\right) \quad (16)$$

CASE 2

The sonde is balanced as described earlier, and then the real part of the signal is measured. Since the sonde is balanced, $n_1 X_1 - n_2 X_2 = 0$, or $$\frac{n_1}{n_2} = \frac{X_2}{X_1}$$

Hence, the measurement (the difference) is:

$$n_1 R_1 - n_2 R_2 = n_1 X_1 \left(\frac{R_1}{X_1} - \frac{R_2}{X_2}\right) \quad (17)$$

As will be appreciated, since the final parenthetical expressions for each case are the same, the measurement ratios (and hence, equivalently, the measurements) are also the same and therefore Case 1 is the same as Case 2. Therefore, whether one balances a tool to measure R, or does not balance the tool and instead measures phase, to a first order approximation the result is the same.

Figure 7:
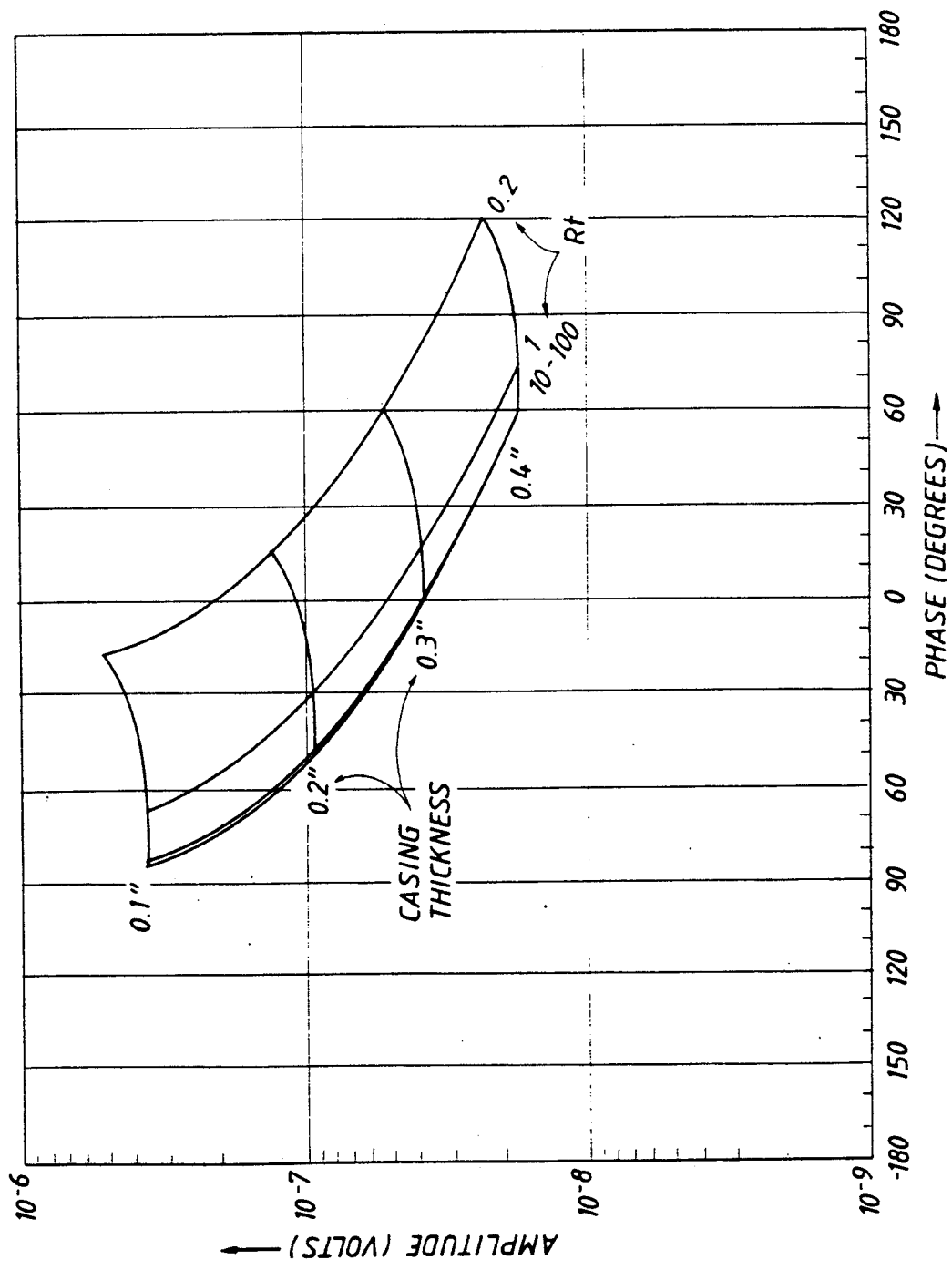
FIG. 7 shows graphically the correspondence between phase and formation resistivity.

The proceding leads to a very important result. By balancing the tool first and then making a phase measurement, the sensitivity to phase change is substantially enhanced, and the dynamic range of the logging tool is increased. This leads directly to the relationships illustrated in FIG. 7, which shows the correspondence between phase, amplitude, casing thickness, and formation resistivity, and is consistent with Equation (14). By including the attenuation information (the amplitude scale), casing thickness can be identified, and the same sensitivity can be maintained over a range of casing thicknesses. The figure also shows the increasing dominance of the casing signal with increasing resistivity, suggesting that a method for determining and subtracting the casing signal would be advantageous in such cases.

Figure 8:
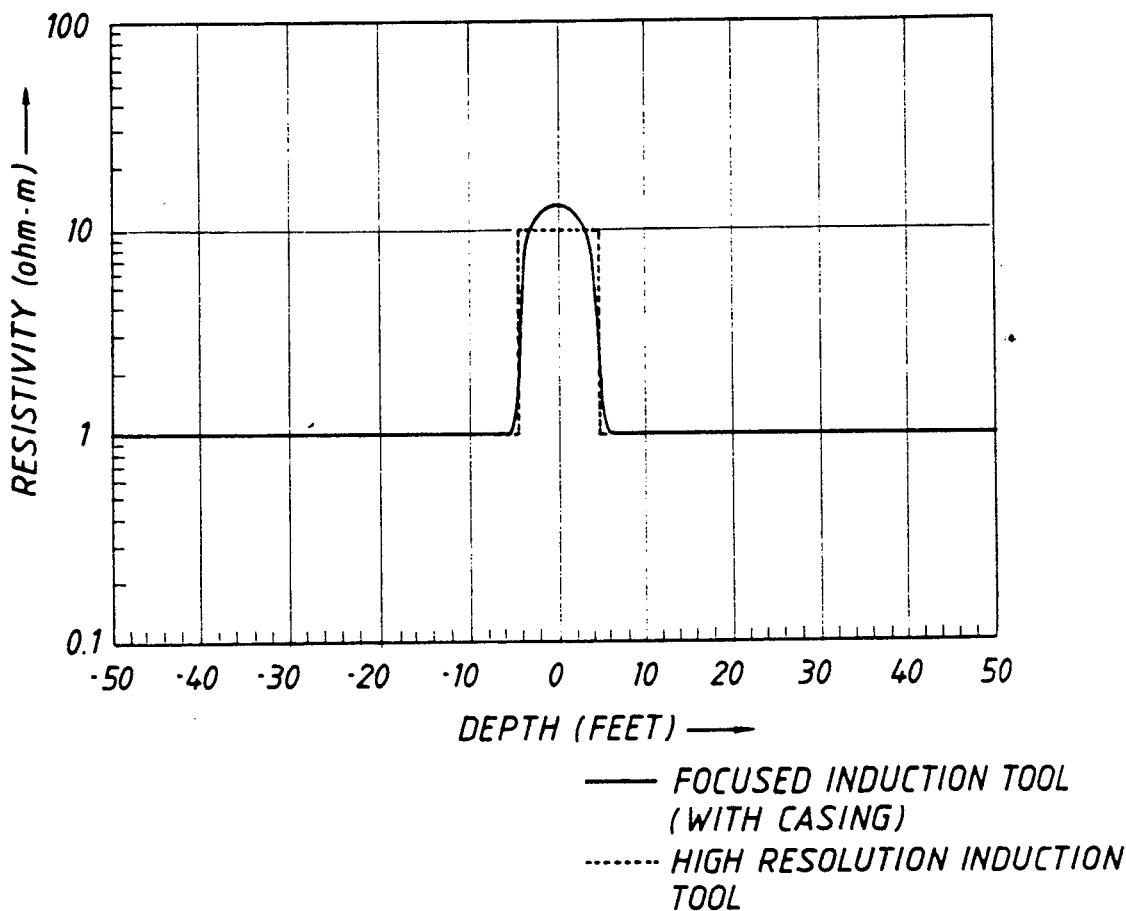
FIG. 8 is a simulated focused, deconvolved induction log through casing according to the teachings of the present invention.

FIG. 8 shows the method of the present invention applied to a balanced, focused tool to generate a simulated log wherein the same deconvolution has been applied which is normally applied in the open hole case.

As may be seen, therefore, the present invention has numerous advantages. Principally, it now makes possible a very practical and very accurate (i.e., high resolution) through-casing induction logging method and apparatus. The invention can be readily adapted to many existing induction logging tool designs, according to the needs and desires of the practitioner, thus lending it great versatility, and making it practical for use in a wide variety of logging situations. The invention also lends itself to a number of variations which may be employed, as desired or needed, to vary or improve the operation according to the conditions at hand. For example, it is within the scope of the present invention to operate the apparatus at two distinct frequencies, such as two kHz and twenty kHz, to determine the casing signal at the higher frequency and then remove the casing contribution from the signal at the (lower) operating frequency. That is, a significant casing effect will be present at higher frequencies, so that a comparison of the measured formation conductivity signals at the two different frequencies will give a good indication of the casing presence at a given logging location. Then, knowing the characteristic response of the logging system at the lower frequency, it is a straightforward matter to back out any residual casing effect which might be present for that location.

ALTERNATE ANALYSIS RELATED TO TWO RECEIVER COIL SYSTEMS

Figure 10:
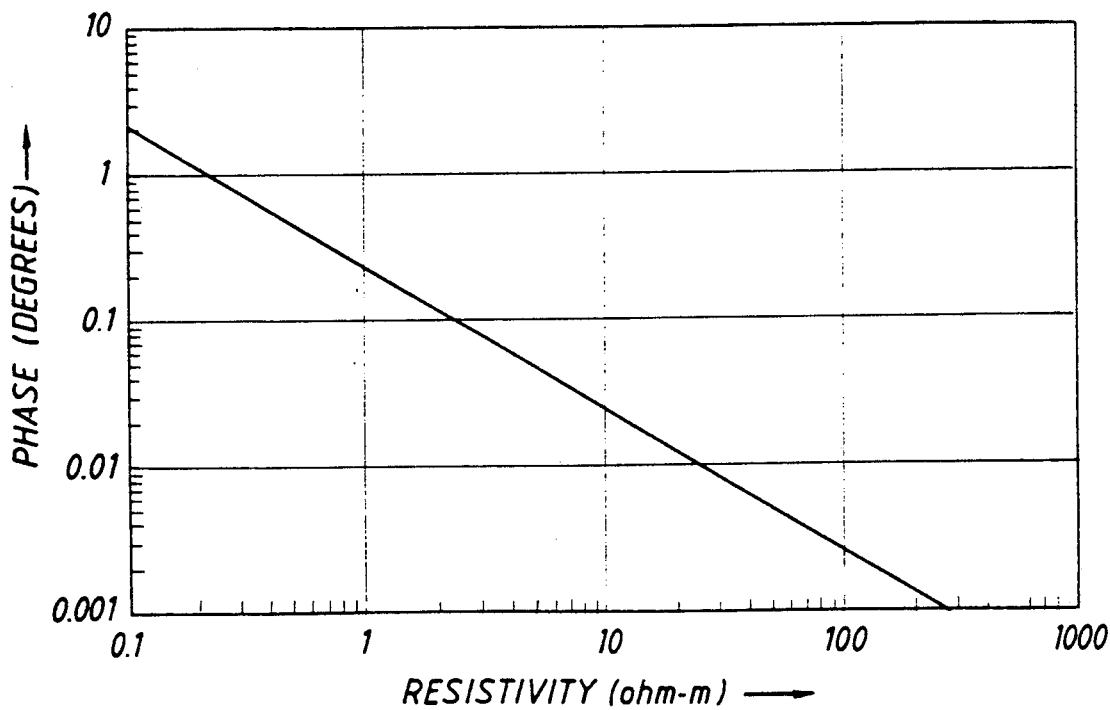
FIG. 10 is a log-log plot of relative phase angle between two receiver coil signals versus formation resistivity.
Figure 11:
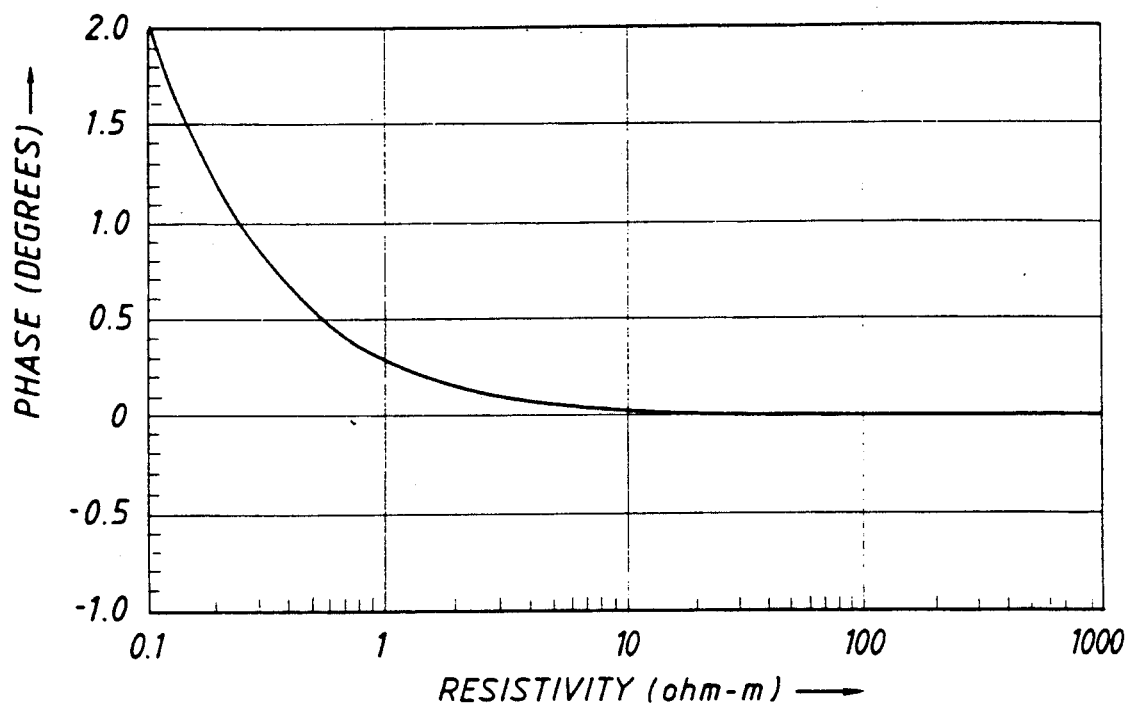
Figure 12:
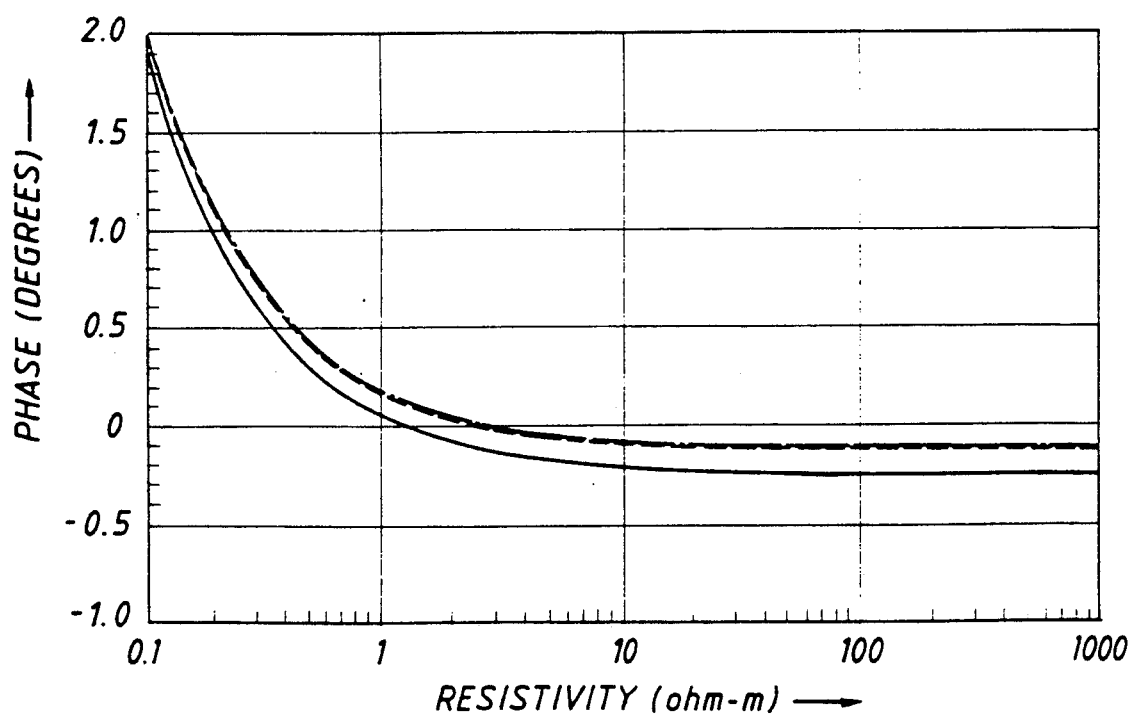
Figure 13:
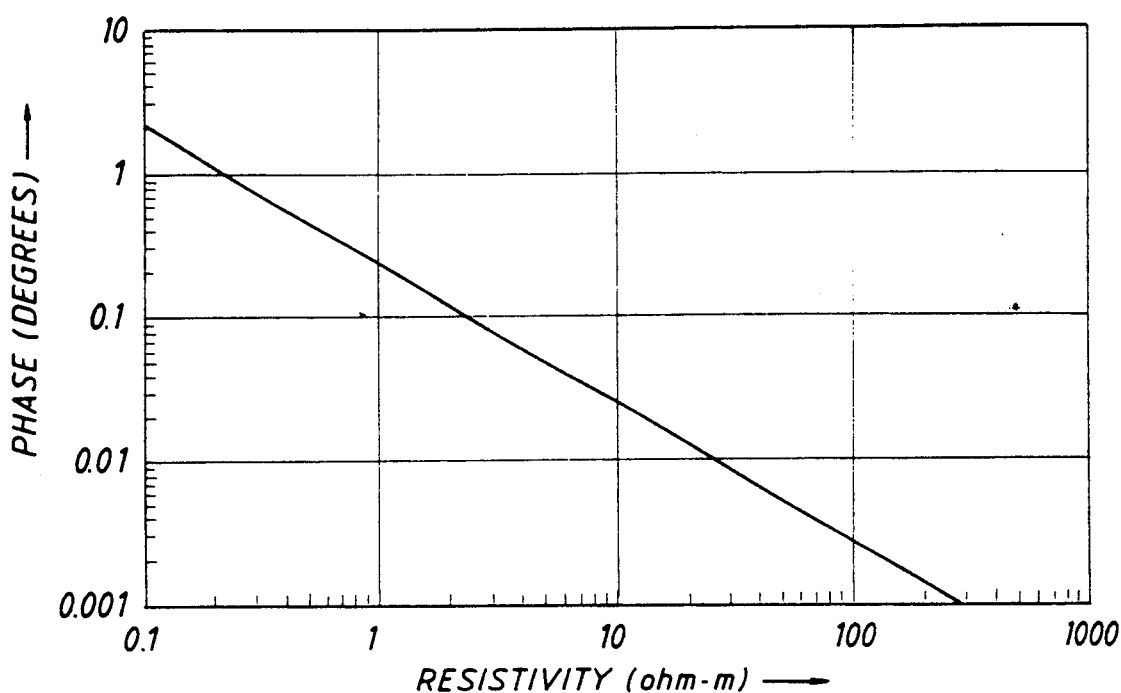
FIGS. 13 and 14 are similar to FIGS. 11 and 12 except that they are presented on log-log graphs.
Figure 14:
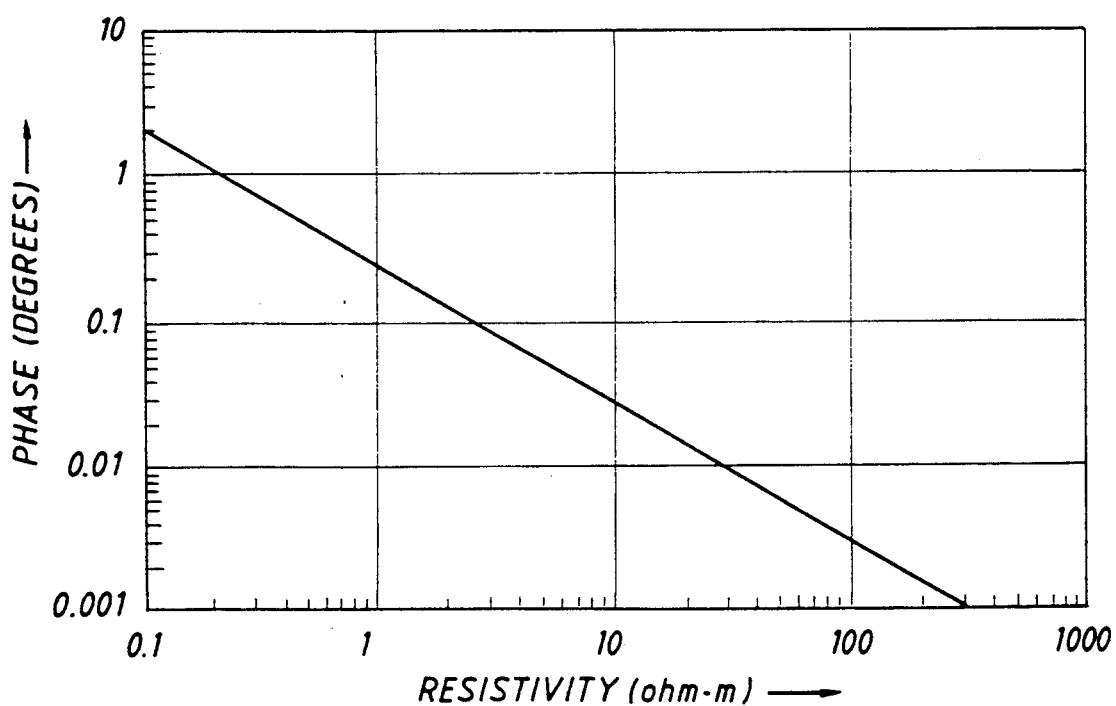

Equation 14 above defines a single variable in the numerator which is the phase angle, or more specifically, the square of the phase angle. Consider, however, an alternate approach. This alternate approach is illustrated in FIG. 9 of the drawings which shows two separate receiver antennas spaced from a transmitter coil. For illustrative purposes, assume that the first receiver coil is located at three feet or thirty-six inches from the transmitter coil and the second is located at forty-eight inches from the transmitter coil. For such an arrangement in an open hole of a nominal eight inch diameter, the relative phase shift measured between the two receiver coils on a log-log plot is shown in FIG. 10 and provides straight line data. That is, at a fixed frequency typically from about 100 Hz but preferably about 2,000 Hz, the continuous wave (CW) phase difference in the two signals at the two receiver coils is shown in FIG. 10 as a function of formation resistivity. This, of course, assumes a formation of relatively substantial thickness (in the vertical dimension). With the abscissa plotted in a linear representation, FIG. 11 shows how the phase angle substantially approaches zero, this being consistent with the representation of FIG. 10. While FIG. 11 is for an open hole, FIG. 12 is for a cased hole where there are different thicknesses of casing with nominal casing thicknesses of 0.1, 0.2, 0.3 and 0.4 inches respectively. The curves have similar shapes and are shifted only slightly as the casing thickness increases. The data of FIGS. 11 and 12 is also shown in a log-log representation in FIGS. 13 and 14. Again, the two graphs differ in that FIG. 13 is for open hole while FIG. 14 is for a cased hole representation. The similarities shown in the several curves plotted in FIG. 12 suggest that casing thickness merely changes the relative phase angle between the two receiver coils. Accordingly, on viewing the log-log representation of FIG. 14, the straight line representation can be applied to all casing thicknesses provided a phase offset is incorporated which accounts for differences in casing thickness. In summary, casing thickness variations (from zero to any common value) can be accommodated in this approach, namely, a phase shift in the log-log graph.

Figure 15:
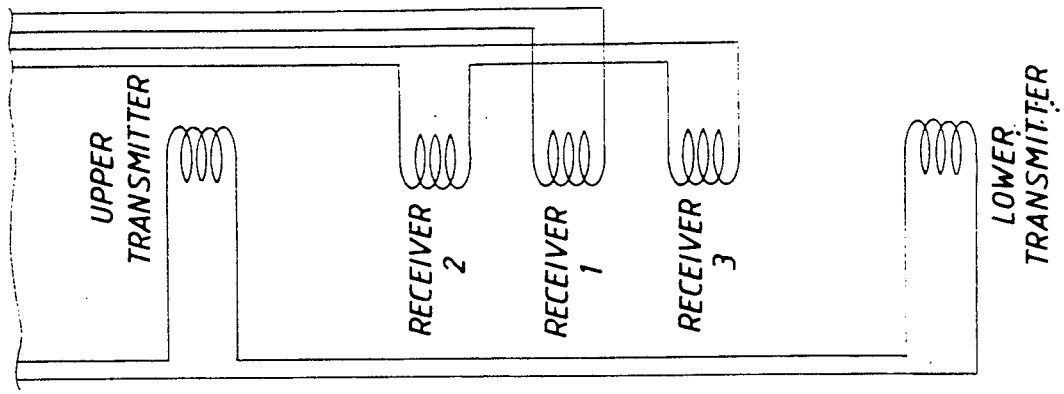
FIG. 15 shows an alternate embodiment utilizing two transmitter coils bracketing three receiver coils where the central receiver coil is independent and the other two receiver coils are connected to add signals.
Figure 16:
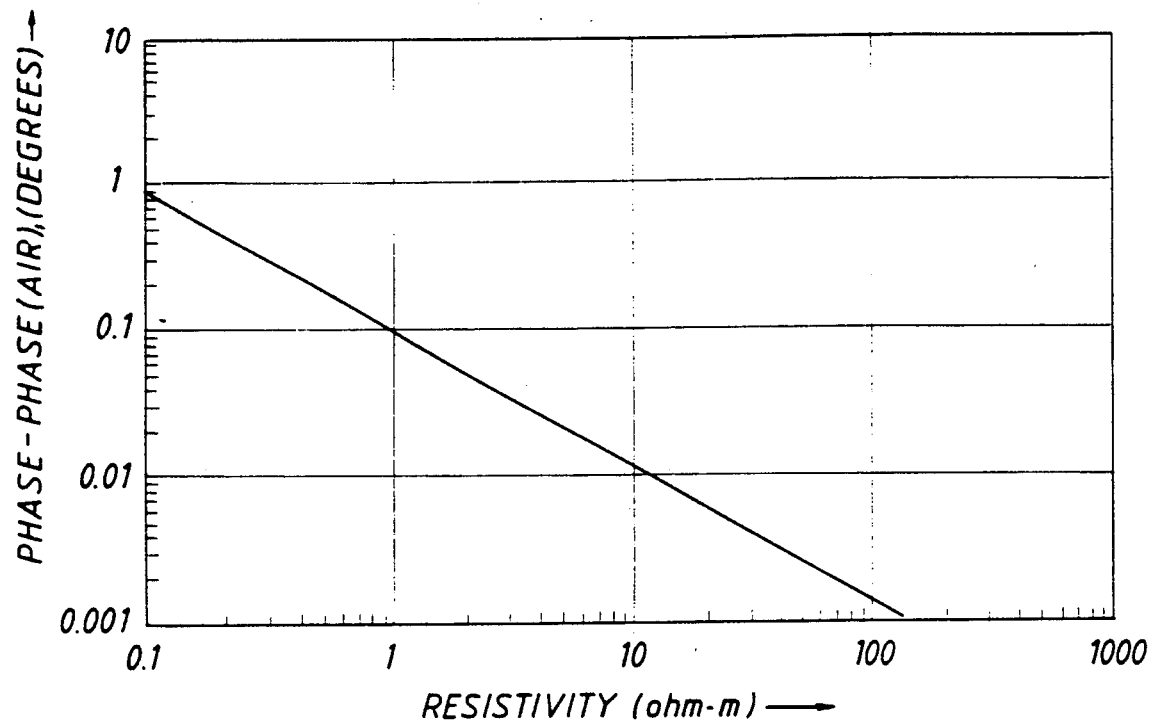
FIG. 16 is a log-log plot of phase difference versus resistivity for the five coil system shown in FIG. 15.

From the foregoing views, it can be seen that simple measurement of the phase difference is quite valuable for obtaining an indication of formation resistivity. Signal enhancement can be obtained by utilizing five coils, two of which are transmitter coils and three receiver coils, see FIG. 15. The transmitter coils (upper and lower) are driven in phase. The symmetrical arrangement of the receiver coils enables the system shown in FIG. 15 to provide reenforced or double amplitude signals in a receiver coils. This improves the response by improving the signal to noise ratio. As shown in FIG. 15, if the upper and lower transmitter coils are driven in phase with one another and are wound so that they are additive in the regions therebetween, then the receiver signals are provided with an enhanced output. The receiver coil 1 is thus the farthest coil from both transmitter coils. It is, however, provided with fields from both transmitter coils and in that sense, it has twice the response output signal because it is provided with a reinforced field strength. The receiver coils 2 and 3 are connected so that they add signals. The receiver signals add and therefore improve the signal to noise ratio also. The output signals added from receiver coils 2 and 3 are thus available so that the signal from receiver coil 1 can be subtracted to obtain the phase difference. Utilizing this enhanced coil system, the response of FIG. 16 is shown. Again, a selected phase offset is incorporated to accommodate casing thickness variations.

Figure 17:
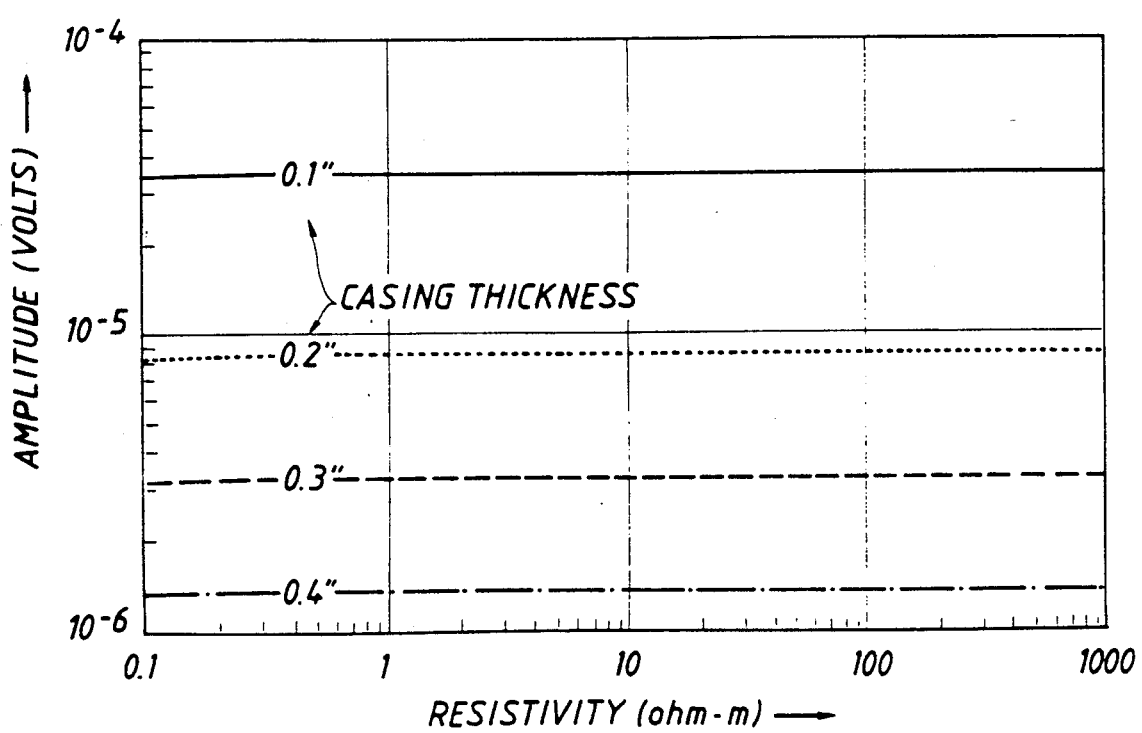
FIG. 17 is a log-log plot of amplitude versus resistivity for variation in casing thickness showing relative signal loss with increasing casing thickness.

FIG. 17 is a representative system utilizing two transmitter and three receiver coils as exemplified in FIG. 15. The two transmitter coils are spaced apart by approximately seventy inches. At a frequency of 2 kHz in a cased well, the responses shown were obtained, illustrating that the response is an enhanced output voltage which has an amplitude dependent on casing thickness. The curves in FIG. 17 are almost straight over nearly three and one half orders of magnitude and show only slight curvature, but even there, the curvature is relatively uniform for the four different thicknesses of casing.

The multiple coil arrangement of FIG. 15 with two spaced transmitter coils and receiver coils therebetween is probably the preferred embodiment because it provides a somewhat sharper bed response. As the signal amplitude increases, the ability of the circuitry to detect phase differences is also enhanced.

Consider a sequence of operations in which the tool is of the present disclosure is used in a well which is cased for a portion or all of its length. The tool is first lowered on the logging cable to the bottom of the well borehole, or at least to the depth desired for inspection and testing. Thereafter, the tool raised at a designated velocity. The velocity typically about 60 or perhaps as much as 120 feet per minute. At typical logging velocities, the tool can be treated as momentarily stationary with respect to a particular formation. As the tool forms the magnetic field imposed on the adjacent formation, the signal is coupled in the manner described from the transmitter coils through the casing and into the adjacent formations. Recall, of course, that the casing must initially be saturated with a DC flux, and that saturation must exist in that region for a sufficient interval that flux build-up transients have died away. In other words, the DC flux is steady state in the particular region. The steady state DC flux thus causes the iron alloyed casing to be magnetically saturated so that the AC permeability in this saturated state is substantially near one, or restated, so that the permeability is substantially fixed for several cycles of the CW transmission. As developed in the earlier portion of this disclosure, the transmitted ray path returns propagated signals to the receiver coils and signals are formed thereby. The two receiver coils form output signals which are individually measured to determine relative phase shift. Relative phase shift can be measured with a degree of accuracy necessary and appropriate to obtain commercially usable data.

The system is thereafter operated in this fashion, namely transmitting and receiving simultaneously as the sonde which supports the logging equipment is raised in the well borehole.

In summary, the formation which is otherwise shielded by ferrous material in the casing can then be logged by inductively inducing the eddy current flowing therein. In that aspect, the logging is conventional. However, the present disclosure sets forth a logging system for through casing operation.

Sometimes one has data listing the casing thickness. The schedule of casing typically will describe the thickness of the casing. At other times, it may not be known. Even in the instance where it is not known, the several curves presented in semi-log plots show that the variations in casing thickness merely shift the curve. The casing thickness can be identified more readily by changing the logging frequency. Alternately, signal amplitude can be measured as indicated by FIG. 17. For instance, the representative curves incorporated with the present disclosure typically show a logging frequency of about 2,000 Hz. Obtaining data at other frequencies such as 200, 500, 1,000, 4,000 and 10,000 Hz provide sufficient data to approximate the casing thickness.

Several practical notes should be observed regarding the use of the present apparatus. Irregularities may arise either from changes in casing, shape or profile or changes in electromagnetic properties of the material making up the casing. The casing may periodically threaded as individual sections which are joined to couplings. In that instance, the threaded connection with the coupling is a region which may provide an irregular magnetic response. Alternately, a change of material in the casing having different electromagnetic properties may cause such a irregular response. This might occur at a weld or patch in the casing. This might sometimes be confused with the formation response. To improve the response and sort out those responses which are a function of the casing construction, and to focus more properly on thin bed resolution, high resolution coil arrays are preferred. For instance, the implementation of additional coils in FIG. 15 enhances the sensitivity of the response and provides higher resolution.

Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. In apparatus for induction logging through casing in a borehole, a system comprising:
   (a) coil means having transmitter and receiver coils adapted for movement through the casing;
   (b) transmitter means for inducing in the receiver coils characteristics of the conductivity of formations adjacent such a borehole;
   (c) means for magnetically saturating a borehole casing in the vicinity of said coil means to substantially reduce the effective incremental magnetic permeability of the casing wherein said means for magnetically saturating the casing comprises:
      (i) a magnetic core within said coil means
      (ii) a non-magnetic, conductive shield between said core and said coil means for excluding AC magnetic fields from said core; and
      (iii) field concentrating means between said shield and said coil means to saturate the casing with a DC flux;
   (d) means associated with said coil means for measuring said characteristic formation conductivity signals between the transmitter and receiver coils while the casing is magnetically saturated; and
   (e) means for detecting the phase difference between at least a pair of said formation conductivity signals for determining from said phase difference the apparent conductivity of borehole formations behind the casing in the vicinity of said coil means.

2. The apparatus of claim 1 wherein said coil means includes plural transmitter coils.

3. The apparatus of claim 2 wherein said transmitter coil sets further comprise a pair of spaced transmitter coils.

4. The apparatus of claim 1 wherein said coil means includes plural receiver coils.

5. The improvement of claim 4 wherein said receiver coils further comprise a pair of receiver coils at different spacings from said transmitter coil.

6. The apparatus of claim 1 wherein said apparatus further comprises a balanced induction logging tool.

7. The apparatus of claim 1 wherein:
   (a) said means for energizing the transmitter coils further comprises means for energizing the transmitter coils at a plurality of frequencies; and
   (b) said means for measuring said characteristic formation conductivity signals further comprises means for comparing said characteristic formation conductivity signals at each of these frequencies for substantially removing possible residual casing signal at the lower of said operating frequencies.

8. The apparatus of claim 1 wherein said means for determining the apparent conductivity of the borehole formations further comprises means for determining the conductivity by dividing a predetermined constant by the transmitter frequency and multiplying by a function.

9. The apparatus of claim 1 wherein said coil means are symmetrical.

10. The apparatus of claim 8 further comprising transmitter coils symmetrically located on each side of said receiver coil means.

11. The apparatus of claim 10 wherein the transmitter coils are driven by a common signal source.

12. The apparatus of claim 1 further comprising means coupled to the receiver coil means for generating a log of the conductivity of the formations.

13. The apparatus of claim 1 wherein said transmitter coil comprises a pair of spaced coils and said receiver coil comprises a coil at different spacings from said transmitter coils.

14. A method for induction logging through casing in a borehole, comprising:
   (a) moving the coil means of an induction logging apparatus through a borehole casing, the coil means having transmitter and receiver coils adapted for movement through the casing and a magnetic core for said coil means;
   (b) magnetically saturating the casing with a DC flux in the vicinity of the coil means to substantially reduce the incremental magnetic permeability of the casing while excluding AC magnetic fields from the area;
   (c) energizing a transmitter driven coil to induce in a receiver coil signals characteristic of the conductivity of formations exterior of the casing in the borehole;
   (d) measuring the characteristic formation conductivity signals at a plurality of different effective spacings between the transmitter and receiver coils with the casing magnetically saturated;

(e) detecting a signal difference between a pair of formation conductivity signals measured at two different spacings; and (f) determining from the measured signal difference the apparent conductivity of borehole formations behind the casing in the vicinity of the coil means.

15. The method of claim 14 including the step of energizing the transmitter coils includes energizing plural transmitter coils.

16. The method of claim 14 wherein the step of inducing coil signals in the receiver coils includes inducing signals in two spaced receiver coils.

17. The method of claim 14 further wherein the step of energizing the transmitter coils is at approximately two kHz or less in frequency.

18. The method of claim 14 further comprising the steps of:

(a) energizing the transmitter coils at a plurality of frequencies; and (b) comparing the characteristic formation conductivity signals at each of these frequencies for substantially removing possible residual casing related signals at the lower of the operating frequencies.

19. The method of claim 14 further wherein the step of magnetically saturating the casing includes locating a magnetic core within the coil means, excluding AC magnetic fields from the core, and concentrating the AC fields between a shield cooperative with the coil means.

20. The method of claim 14 wherein said step of determining the apparent conductivity of the borehole formations further comprises determining the conductivity by dividing a predetermined constant by the transmitter frequency and multiplying by a function of the measured signal difference.

21. The method of claim 20 wherein the measured signal difference is signal phase differences.

22. The method of claim 21 wherein signal phase difference is squared to obtain the apparent conductivity.

23. The method of claim 22 wherein signal phase difference is the only variable.

24. The method of claim 14 further including the step of generating a log of the conductivity of the formations as a function of borehole depth.

25. The method of claim 14 including the step of measuring phase differences from two signals received from a single transmitted signal.

26. The method of claim 14 including the step of measuring received signals at two receiver coils at different distances from a transmitter coil.

27. The method of claim 14 including the step of measuring received signals at two different distances from a transmitter coil.

* * * * *